(12) United States Patent
Weismiller

(10) Patent No.: US 6,948,202 B2
(45) Date of Patent: Sep. 27, 2005

(54) ACCESSORIES FOR A PATIENT SUPPORT APPARATUS

(75) Inventor: Matthew W. Weismiller, Batesville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 10/715,725

(22) Filed: Nov. 18, 2003

(65) Prior Publication Data

US 2004/0068798 A1 Apr. 15, 2004

Related U.S. Application Data

(63) Continuation of application No. 09/736,100, filed on Dec. 13, 2000, now Pat. No. 6,691,350.
(60) Provisional application No. 60/170,304, filed on Dec. 13, 1999.

(51) Int. Cl.[7] .............................................. A61G 7/075
(52) U.S. Cl. .................................. 5/624; 5/602; 5/648
(58) Field of Search ........................... 5/621, 624, 602, 5/648, 651

(56) References Cited

U.S. PATENT DOCUMENTS

| | | | |
|---|---|---|---|
| 1,372,546 A | 3/1921 | Read et al. .................... 297/23 |
| 1,408,834 A | 3/1922 | Seavey ......................... 403/59 |
| 1,604,870 A | 10/1926 | Asman ........................ 403/396 |
| 2,267,583 A | 12/1941 | Carroll .................. 248/229.12 |
| 2,310,276 A | 2/1943 | Bilz ............................ 403/385 |
| 2,456,505 A | 12/1948 | Hastings ...................... 403/59 |
| 2,470,524 A | 5/1949 | Scudder .................... 248/122.1 |
| 2,529,173 A | 11/1950 | Moyer et al. .................. 5/425 |
| 2,622,831 A | 12/1952 | Fullwood ............... 248/292.12 |
| 2,673,771 A | 3/1954 | Krewson ................. 248/227.1 |
| 2,696,963 A | 12/1954 | Shepherd .............. 248/229.15 |
| 2,696,996 A | 12/1954 | Engelhardt .................. 403/391 |
| 2,940,783 A | 6/1960 | Engelhardt .................. 403/389 |
| 3,046,072 A | 7/1962 | Douglass, Jr. et al. .......... 5/646 |
| 3,157,378 A | 11/1964 | Blum ....................... 248/230.1 |
| 3,216,752 A | 11/1965 | Rifken ....................... 403/217 |
| 3,339,913 A | 9/1967 | Anderson ...................... 5/600 |
| 3,677,584 A | 7/1972 | Short ........................ 403/389 |
| 3,858,938 A | * 1/1975 | Kristensson et al. ... 297/423.19 |
| 4,018,412 A | 4/1977 | Kees, Jr. et al. ............ 248/214 |
| 4,039,223 A | * 8/1977 | Kristensson .................. 297/90 |
| 4,139,917 A | 2/1979 | Fenwick ........................ 5/602 |
| 4,190,224 A | 2/1980 | LeBlanc et al. .......... 248/227.3 |
| 4,225,104 A | 9/1980 | Larson .................... 248/125.8 |
| 4,262,872 A | 4/1981 | Kodet ..................... 248/311.3 |
| 4,489,454 A | 12/1984 | Thompson .................. 5/503.1 |
| 4,547,092 A | 10/1985 | Vetter et al. .................. 403/59 |
| 4,615,058 A | 10/1986 | Feldt ............................ 5/602 |
| 4,747,569 A | 5/1988 | Hoshino ................. 248/291.1 |
| 4,796,846 A | 1/1989 | Meier et al. ............. 248/286.1 |
| 4,865,484 A | 9/1989 | McConnell .................. 403/59 |
| 4,945,592 A | 8/1990 | Sims et al. .................... 5/658 |
| 4,949,928 A | 8/1990 | Hoshino ................. 248/291.1 |
| 4,969,768 A | 11/1990 | Young .......................... 403/97 |
| 5,016,307 A | 5/1991 | Rebar ......................... 5/503.1 |

(Continued)

FOREIGN PATENT DOCUMENTS

| | | |
|---|---|---|
| DE | 91 03 886.3 | 8/1991 |
| FR | 1.005.292 | 4/1952 |
| WO | WO 96/22758 | 8/1996 |

OTHER PUBLICATIONS

OR Direct® Surgical Table Accessories Brochure, Spring/Summer 2000, 24 pgs.
Hill–Rom® Affinity II Bed Brochure, 1998, 6 pgs.

Primary Examiner—Robert G. Santos
(74) Attorney, Agent, or Firm—Bose McKinney & Evans LLP

(57) ABSTRACT

A foot section is provided for use with a patient support. The foot section includes a body and at least one support coupled to the body.

24 Claims, 2 Drawing Sheets

U.S. PATENT DOCUMENTS

| | | | |
|---|---|---|---|
| 5,060,327 A | 10/1991 | Celestina et al. | 5/662 |
| 5,094,418 A | 3/1992 | McBarnes, Jr. et al. | 248/286.1 |
| 5,108,213 A | 4/1992 | Shields | 403/18 |
| 5,135,210 A | 8/1992 | Michelson | 5/658 |
| 5,157,800 A | 10/1992 | Borders | 5/602 |
| 5,226,187 A | 7/1993 | Borders et al. | 5/602 |
| 5,319,816 A | 6/1994 | Ruehl | 5/600 |
| 5,358,205 A | 10/1994 | Starkey et al. | 248/220.21 |
| 5,381,571 A | 1/1995 | Gabhart | 5/430 |
| 5,407,163 A | 4/1995 | Kramer et al. | 248/291.1 |
| 5,538,215 A | 7/1996 | Hosey | 248/286.1 |
| 5,647,491 A | 7/1997 | Foster et al. | 211/113 |
| 5,699,988 A | 12/1997 | Boettger et al. | 248/122.1 |
| 5,735,499 A | 4/1998 | Phillips et al. | 248/230.1 |
| 5,741,210 A | 4/1998 | Dobrovolny | 600/227 |
| 5,836,559 A | 11/1998 | Ronci | 248/230.3 |
| 5,927,670 A | 7/1999 | Hsieh | 248/405 |
| 6,042,541 A | 3/2000 | Dobrovolny et al. | 600/228 |
| 6,098,950 A | 8/2000 | Zupan et al. | 248/674 |
| 6,185,769 B1 * | 2/2001 | Larisey et al. | 5/648 |
| 6,315,260 B1 | 11/2001 | Lees | 248/286.1 |
| 6,499,158 B1 | 12/2002 | Easterling | 5/621 |
| 6,622,324 B2 | 9/2003 | VanSteenburg et al. | 5/621 |
| 6,691,350 B2 * | 2/2004 | Weismiller | 5/621 |
| 6,757,924 B2 * | 7/2004 | Goodwin et al. | 5/602 |
| 2001/0039680 A1 | 11/2001 | Boucher et al. | 5/623 |
| 2002/0095728 A1 | 7/2002 | Weismiller | 5/503.1 |
| 2002/0157186 A1 | 10/2002 | VanSteenburg et al. | 5/621 |
| 2003/0019039 A1 * | 1/2003 | Goodwin et al. | 5/602 |
| 2004/0068798 A1 * | 4/2004 | Weismiller | 5/624 |
| 2004/0226092 A1 * | 11/2004 | Goodwin et al. | 5/602 |

* cited by examiner

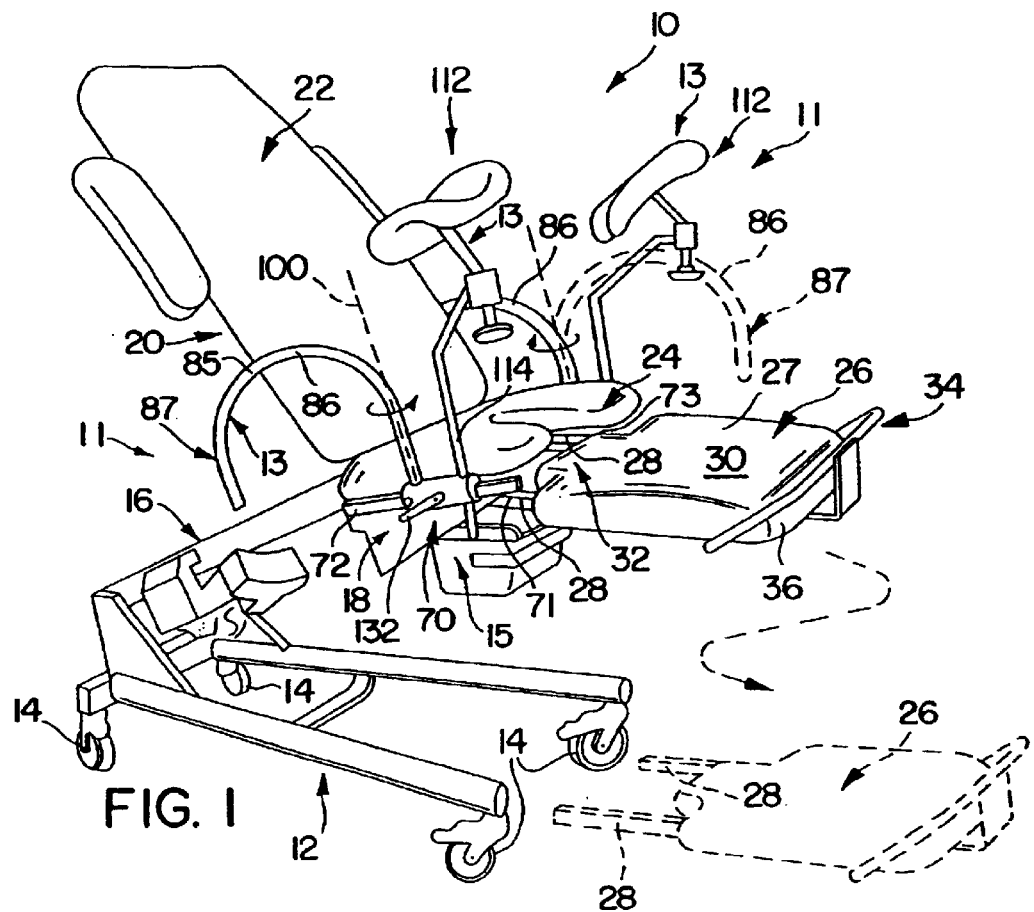
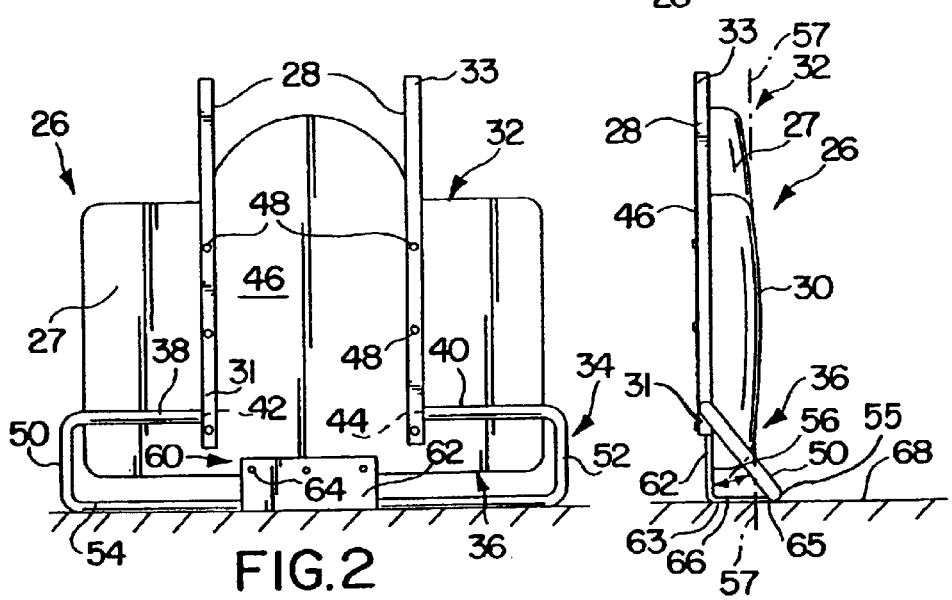

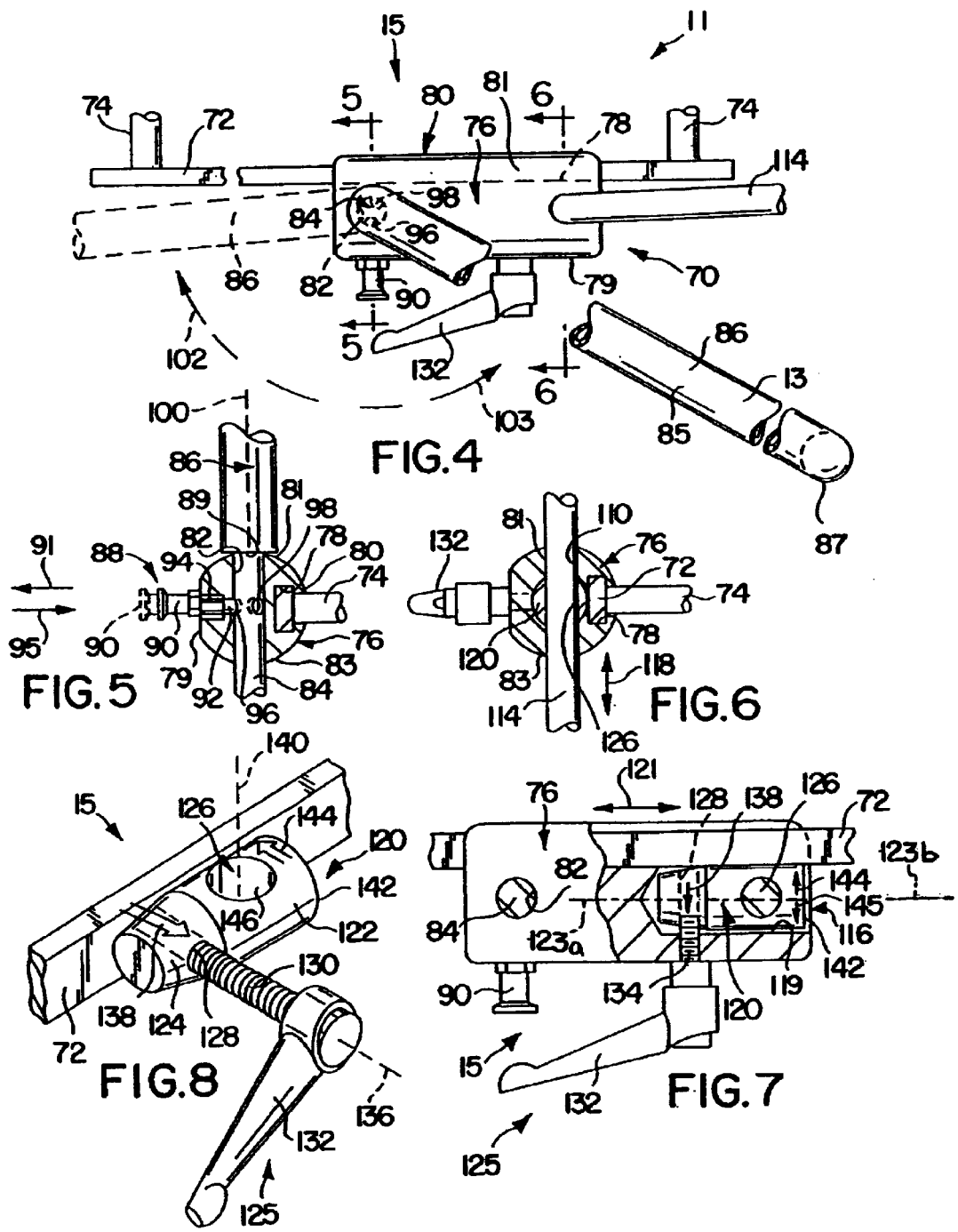

ACCESSORIES FOR A PATIENT SUPPORT APPARATUS

CROSS-REFERENCE TO RELATED APPLICATIONS

This application is a continuation of U.S. patent application Ser. No. 09/736,100, filed Dec. 13, 2000 now U.S. Pat. No. 6,691,350, which claims the benefit of U.S. Provisional Application Ser. No. 60/170,304, filed Dec. 13, 1999, the disclosures of which are expressly incorporated by reference herein.

BACKGROUND AND SUMMARY OF THE INVENTION

The present invention relates to a patient support apparatus. More particularly, the present invention relates to accessory items configured to be coupled to a patient support apparatus such as a birthing table, a surgical table, a stretcher, a bed, a chair, or other type of patient support apparatus.

It is known to provide birthing beds as shown, for example, in U.S. Pat. No. 5,157,800. It is also known to attach accessories to a patient support as shown, for example, in U.S. Pat. Nos. 5,836,559 and 5,135,210.

According to the present invention, an accessory holder for use with a patient support is provided to position accessories relative to the patient support. The accessory holder includes first and second bodies and a coupler. The first body is adapted to couple to the patient support and includes a cavity. The second body is positioned in the cavity of the first body. At least one of the first and second bodies is configured to receive an accessory. The coupler is coupled to at least one of the first and second bodies and is configured to pivot the second body relative to the first body.

In addition, according to the present invention, an accessory holder system for use with a patient support is provided. The accessory holder system includes a barrier, a leg holder, and a body adapted to couple to the patient support. The barrier and leg holder are coupled to the body.

Further, according to the present invention, an accessory holder system for use with a patient support is provided. The accessory holder system includes a handrail, a leg holder, and a body adapted to couple to the patient support. The handrail and leg holder are coupled to the body.

A patient support apparatus is also provided that includes a patient support, a holder, an arm member, and a coupler. The patient support includes a main body and a removable foot support section that is either coupled to or removed from the main body which has a head end and a foot end. The holder is coupled to the patient support and the arm member is coupled to the holder. The coupler is coupled to the holder and movable between a first position interacting with the arm member to fix the position of the arm member relative to the patient support and a second position spaced apart from the arm member to permit the arm member to move relative to the patient support.

According to the present invention, a removable foot section for a patient support is provided. The foot section includes a body and an L-shaped support. The body includes a bottom surface, a top surface, a head end portion, and a foot end portion. The L-shaped support includes a first portion coupled to the body and a second portion spaced-apart from the body adjacent to the foot end portion. The second portion is substantially perpendicular to the bottom surface of the body.

According to the present invention, a removable foot section for a patient support is provided. The foot section includes a body having a bottom surface, a top surface, a head end portion, and a foot end portion. The top surface of the body includes an uppermost surface that lies in a top plane. The foot section further includes a support having a first portion coupled to the body and a second portion spaced-apart from the body adjacent to the foot end portion. The top plane of the body is positioned between the first and second portions of the support.

Additional features of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a patient support apparatus including a base, a frame coupled to the base by a linkage, a patient support surface coupled to the frame, and a plurality of accessory items configured to be coupled to a frame adjacent the patient support surface;

FIG. 2 is a bottom plan view of a bottom surface of a removable foot section of the present disclosure;

FIG. 3 is a side elevational view of the removable foot section of FIGS. 1 and 2;

FIG. 4 is a top view of an accessory holder apparatus of the present disclosure which is configured to be coupled to an accessory rail of the patient support apparatus and illustrating an arm pivotably coupled to the accessory holder apparatus to provide a siderail and an egress assist bar;

FIG. 5 is a sectional view taken along lines 5—5 of FIG. 4 illustrating a locking pin for holding the arm in first and second positions relative to the patient support surface;

FIG. 6 is a sectional view taken along lines 6—6 of FIG. 4 illustrating details of the accessory holder and illustrating a clamping mechanism for securing the accessory holder to the accessory rail of the patient support apparatus;

FIG. 7 is a sectional view similar to FIG. 4 illustrating operation of the clamping mechanism of the accessory holder which simultaneously locks the accessory holder in a predetermined position on the accessory rail of the patient support apparatus and locks an accessory item such as a leg holder in a predetermined location relative to the accessory holder; and FIG. 8 is a perspective view illustrating further details of the clamping mechanism of the present disclosure.

DETAILED DESCRIPTION OF THE DRAWINGS

A patient support apparatus 10 and an accessory apparatus 11 that is coupled to the patient support apparatus 10 are shown in FIG. 1. The patient support apparatus 10 includes a base 12 having a plurality of casters 14, a lifting mechanism 16, a support frame 18 coupled to the base 12 by lifting mechanism 16, and a patient support surface 20 coupled to frame 18. The accessory support apparatus 11 includes accessories 13 and a support 15 that couples the accessories 13 to the patient support apparatus 10.

The patient support surface 20 includes a back support section 22, a seat support section 24, and a removable foot support section 26. In the illustrated embodiment, the removable foot support section 26 includes square mounting members, illustratively tubes 28 configured to slide within larger square receiving tubes which are coupled to frame 18 of patient support apparatus 10. In alternative embodiments, other types of removable foot sections may be used in accordance with the present invention. In addition, various locking mechanisms may be provided to secure the removable foot section 26 to the frame 18.

Foot section 26 includes a body 27 having a head end portion 32, foot end portion 36, a bottom surface 46, and a generally planar top surface 30. The top surface 30 supports legs of a patient located on the patient support apparatus 10. As best shown in FIGS. 2 and 3, the mounting bars 28 are coupled to the bottom surface 46 and include a first end 31 positioned in the foot end portion 36 and a second end 33. Mounting bars 28 are secured to bottom surface 46 of removable foot section 26 with suitable fasteners 48. The mounting bars 28 extend from their first end 31 away from the head end portion 32 of the foot section 26 so that the second end 33 is spaced apart from the foot end portion 36 as shown in FIG. 2.

The foot section 26 further includes an end bar or support 34 coupled to the foot end portion 36 of foot section 26 as shown in FIGS. 2 and 3. The end bar 34 includes bottom portions 38 and 40, upwardly extending side portions 50, 52 coupled to the bottom portions 38, 40, respectively, and a generally horizontal end or middle portion 54 defining an upper part 55 and extending between side portions 50 and 52. The bottom portions 38, 40 are positioned adjacent to the bottom surface 46 of the foot section 26 and each include ends 42 and 44, respectively, that are coupled to the mounting bars 28.

As best shown in FIG. 3, the side portions 50 and 52 extend at an angle relative to the top and bottom surfaces 30 and 46 of foot section 26. The angle 56 shown in FIG. 3 is illustratively about 40° relative to the bottom surface 46. In alternative embodiments, the side portions may be aligned at other angles relative to the top and bottom surfaces of the foot section.

The end bar 34 is angled so that the horizontal end portion 54 of the bar 34 is positioned above the top surface 30 to deter a patient from sitting on the removable foot section 26 adjacent the foot end 36. The top surface 30 includes an uppermost portion that lies in a top plane 57.

The foot section 26 further includes a center support bracket 60 coupled to bottom surface 46 of foot section 26 by suitable fasteners 64. The center support bracket 60 is generally L-shaped and includes first and second portions 62, 66. The first portion 62 is coupled to bottom surface 46 of foot section 26 and the second portion 66 extends upwardly away from the first portion 62 and is coupled to the end portion 54 of bar 34 by welding or other suitable fastening method. The second portion 66 includes a first end 63 coupled to first portion 62 and a second end 65 defined by an upper part of the second portion 66. The top plane 57 defined by the uppermost portion of top surface 30 is positioned between second end 65 of support bracket 60 and body 27 of foot section 26 and between the middle portion 54 of end bar 34 and body 27.

The center support bracket 60 provides a stand for supporting the removable foot section 26 in a vertical orientation as shown in FIGS. 2 and 3 when the foot section 26 is not being used on the patient support apparatus 10. This permits the removable foot section 26 to be stored in an upright vertical position on the floor 68 as shown in FIGS. 2 and 3 to minimize the floor space occupied by the removable foot section 26 when the removable foot section 26 is removed from the patient support apparatus 10.

The support 15 of the accessory support apparatus 11 includes first and second accessory holders 70 (second not shown) and first and second accessory rails 72 (second not shown) that couple the accessory holders 70 to the patient support 10. The frame 18 includes spaced-apart sides 71, 73 and the first and second accessory rails 72 are coupled to the first and second sides 71, 73 of frame 18, respectively, as shown in FIG. 1. As shown in FIG. 4, the support 15 further includes spacers 74 and fasteners (not shown) that extend from each accessory rail 72, through the spacers 74 to the frame 18 to couple the accessory rails 72 to the sides 71, 73 of frame 18.

The accessory holders 70 support accessories 13 in a desired position relative to the patient support 10. In the illustrated embodiment, the accessories 13 include arm members 86 and leg holders 112 as shown in FIG. 1. In the illustrated embodiment, the leg holders 112 are knee crutches. In alternative embodiments, the leg holders may be other devices such as leg stirrups. The arm members 86 each include a cylindrical mounting portion or shaft 84, a curved arm 85 coupled to the shaft 84, and a shoulder 89 positioned between the shaft 84 and curved arm 85 as shown in FIGS. 1, 4 and 5. Shaft 84 includes first and second spaced-apart pin receiving apertures 96 and 98 as shown in FIG. 5.

The first and second accessory holders 70 are coupled to the first and second accessory rails 72, respectively, and thus are positioned along the first and second sides of frame 18 and patient support 10. The holders 70 of the present disclosure include an elongated body portion 76, first and second coupling portions 82, 110, a first coupler or detent 88 coupled to the body portion 76, and a second coupler or clamping mechanism 116. The detent 88 secures an accessory 13 to body portion 76 and clamping mechanism 116 secures another accessory 13 to body portion 76 and secures body 76 to accessory rail 72. The body portion 76 of the holders 70 include a first side 80 facing toward the patent support 10, a second side 79 facing away from the patient support 10, a top side 81, and a bottom side 83.

The body portions 76 of holders 70 include a track 78 that defines a recess or channel formed along their first side 80. Each track 78 is configured to slide over an accessory rail 72 as best shown in FIGS. 5 and 6. As discussed below, the clamping mechanism 116 is configured to secure the body portion 76 in a desired location on the accessory rail 72.

In the illustrated embodiment, the first coupling portion 82 of body portion 76 is an aperture 82 that extends from the top side 81 to the bottom side 83 as best shown in FIG. 5. The shaft 84 of arm member 86 is received in the aperture 82 and held in position within the aperture 82 relative to the body portion 76 by the detent 88. In the illustrated embodiment, the detent 88 is a pull pin assembly that includes a knob 90, a pin 92 coupled to the knob 90, and a spring 94 that biases the knob 90 and pin 92 inwardly in the direction of arrow 95 as shown in FIG. 5.

When the pull pin 90 is moved in direction 91 to the position shown in phantom lines in FIG. 5, the arm member 86 is pivotable in directions 102, 103 about axis 100 between the solid and phantom line positions shown in FIGS. 1 and 4. The arm members 86 are movable between these positions so that the arm members 86 may both assist a patient in moving on and off the patient support 10 and act as siderails or barriers for the patient support 10. In addition, the patient may grip the arm members 86 during a medical procedure.

To assist a patient in moving onto the patient support 10, the foot section 26 may be removed and the arm members 86 may be moved to their positions shown in phantom lines in FIG. 1. In this position, the distal ends 87 of the arm members 86 are positioned adjacent to a foot end of the seat section 24. Therefore, the arm members 86 are in a position where the patient may grab the arm members 86 and thus the arm members 86 provide an assist arm to help a patient move onto and off of the patient support surface 20 when the foot section 26 is removed.

Once the patient is on the patient support surface 20, pull pin 90 is moved in direction 91 against the bias of spring 94 to the position shown in phantom lines of FIG. 5 to release the pin 92 from aperture 96. The arm members 86 are then pivoted about axis 100 in the direction of arrow 102 in FIG. 4 to the solid line positions in FIG. 1 and the phantom line position in FIG. 4 so that the arm members 86 act as siderails or barriers for the patient on the patient support surface 20. In the illustrated embodiment, the arm members 86 may only be fixed relative to the accessory holders 70 and thus the patient support 10 in two positions as provided by the location of the first and second spaced-apart pin receiving apertures 96 and 98 of the arm members 86. In alternative embodiments, any number of apertures in various positions may be provided so that the arm members can be fixed relative to the patient support in any desired position.

In the illustrated embodiment, the second coupling portion 110 of the body portion 76 of holder apparatus 70 is an aperture 110 that is spaced apart from aperture 82 as shown in FIGS. 6–8. The aperture 110 extends from the top side 81 of the body portion 76 to the bottom side 83 of the body portion 76. The leg holders 112 are positioned in the aperture 110 and are movable within the aperture 110 to various positions to accommodate the patient using the holders 112. The holders 112 include a mounting rod 114 that is configured to extend through the aperture 110 formed in the body portion 76 as shown in FIGS. 6 and 7.

As previously mentioned, the clamping mechanism 116 is configured to secure the body portion 76 in a desired location on the accessory rail 72. In addition to securing the body portion 76 relative to the accessory rail 72, the clamping mechanism 116 also locks the rod 114 in a desired position relative to body portion 76. When the clamping mechanism 116 is released, the bar 114 can slide up or down in the directions indicated by double-headed arrow 118 in FIG. 6 to adjust the height of an accessory 13 and the body 76 can slide in the directions indicated by double-headed arrow 121 in FIG. 7 to adjust the position of an accessory holder 70.

Clamping mechanism 116 includes a body portion 120 having a first cylindrical portion 122 and a second tapered portion 124 and an actuator 125 as shown in FIG. 8. The body portion 120 of clamping mechanism 116 is located within a cavity 119 formed in the body portion 76 of the accessory holder 70 as shown in FIG. 7. The cavity 119 defines a first longitudinal axis 123a while the body portion 120 defines a second longitudinal axis 123b. An aperture 126 is formed in the cylindrical portion 122 and the rod 114 of holder 112 extends through this aperture 126 as shown in FIG. 6. A threaded aperture 128 is formed in tapered portion 124 and extends substantially transverse to the aperture 126 formed in cylindrical portion 122 as shown in FIGS. 7 and 8.

The actuator 125 is positioned in the threaded aperture 128 and is movable in the aperture 128 to permit the position of the holders to be fixed or moved relative to the patient support 10. The actuator 125 includes a threaded shaft 130 and a handle 132 coupled to the shaft 130. The second side 79 of body portion 76 of accessory holder 70 further includes a non-threaded aperture 134 and the threaded shaft 130 extends through the non-threaded aperture 134 to reach the threaded aperture 128 of body portion 120 of clamping mechanism 116 as shown in FIG. 7.

Once the body portion 76 of accessory holder apparatus 70 is located at a desired position on accessory rail 72 and the holders 112 are located at a desired height, actuator 125 is used to secure the positions of the body 76 and holders 112. To secure the body 76 and holders 112, the handles 132 of actuators 125 are rotated about axis 136. This rotation causes the tapered portion 124 of body 120 to move along the threaded shaft 130 toward the handle 132 in the direction of arrows 138 in FIGS. 7 and 8. Such movement of the tapered portion 124 causes the body portion 120 to pivot about an axis 140 so that an end 142 of body portion 120 moves in the direction of arrow 144, and the second longitudinal axis 123b moves relative to the first longitudinal axis 123a. As the end 142 moves in the direction of arrow 144, the portion of body 120 adjacent end 142 applies a force against the accessory rail 72 in the direction of arrow 145 to hold the body portion 76 in the desired position on the accessory rail 72. In addition, a side wall 146 which defines aperture 126 in body portion 120 also applies a force in the direction of arrow 144 against rod 114 of holder 112 to hold the rod 114 in a selected vertical position relative to body portion 76. In other words, the actuator 125 locks both the body portion 76 in position on the accessory rail 72 and the rod 114 of holder 112 at a desired position within body portion 76.

In alternative embodiments, the body 120 can be rotated relative to the body 76 by other mechanisms such as a cam or linkage. In addition, in alternative embodiments, the body 76 may include a threaded aperture and the body 120 may have a non-threaded aperture and these apertures may interact with a threaded member to move the body 120 relative to the body 76.

Although the invention has been described in detail with reference to certain illustrated embodiments, variations and modifications exist within the scope and spirit of the present invention as described and defined in the following claims.

What is claimed is:

1. A foot section for a patient support, the foot section including:
    a body having a bottom surface, a top surface, a head end portion, and a foot end portion;
    an L-shaped support configured to move in response to movement of the body, the L-shaped support having a first portion coupled to the body and a second portion spaced-apart from the body adjacent to the foot end portion, the second portion maintaining a substantially perpendicular disposition relative to the top surface of the body, and
    a second support having a first portion coupled to the body, a second portion coupled to the L-shaped support, the first portion including a first end and a second end, the second portion including a middle portion, and side portions coupled to the middle portion, the side portions extending upwardly at an angle relative to the bottom surface of the body.

2. The foot section of claim 1, wherein the angle relative to the bottom surface of the body is substantially equal to 40 degrees.

3. The foot section of claim 1, wherein the second portion of the L-shaped support includes a first end coupled to the first portion of the L-shaped support and a second end, the top surface of the body including an uppermost surface that lies in a top plane, the top plane is positioned between the first and second ends of the second portion of the L-shaped support.

4. The foot section of claim 1, wherein the L-shaped support is coupled to the bottom surface of the body.

5. The foot section of claim 1, further comprising mounting members configured to releasably couple with a frame of the patient support.

6. The foot section of claim 1, wherein the second support includes a first end coupled to the body, a second end coupled to the body, and a middle portion directly coupled to the L-shaped support.

7. A foot section far a patient support, the foot section including:
   a body having a bottom surface, a top surface, a head end portion, and a foot end portion, the top surface of the body including an uppermost surface that lies in a top plane; and
   a support fixed relative to the body, the support having a first portion coupled to the body, a second portion having an upper part spaced-apart from the body adjacent to the foot end portion, and an angled portion extending upwardly at an angle relative to the bottom surface of the body of about 40 degrees, the top plane of the body being positioned between the first portion and the upper part of the second portion.

8. The foot section of claim 7, wherein the support is L-shaped.

9. The foot section of claim 7, further comprising mounting members configured to releasably couple with a frame of the patient support.

10. A foot section for a patient support, the foot section including:
    a body having bottom surface, a top surface, a head end portion, and a foot end portion, the top surface of the body including an uppermost surface that lies in a top plane; and
    a support configured to move with the body, the support having a first portion coupled to the body and a second portion having an upper part spaced-apart from the body adjacent to the foot end portion, the top plane of the body being positioned between the first portion and the upper part of the second portion, the support including a first end coupled to the body, a second end coupled to the body, a middle portion positioned between the first and second ends, and side portions coupled to the middle portion, wherein the side portions extend upwardly at an angle relative to the bottom surface of the body and the top plane is positioned between the first and second ends and the middle portion.

11. A foot section for a patient support, the foot section including:
    a body having a bottom surface, a top surface, a head end portion, and a foot end portion, the top surface of the body including an uppermost surface that lies in a top plane; and
    a support configured to move with the body, the support having a first portion coupled to the body and a second portion having an upper part spaced-apart from the body adjacent to the foot end portion, the top plane of the body being positioned between the first portion and the upper part of the second portion, the support including an L-shaped support having a first portion coupled to the body and a second portion, and a second support having a first end coupled to the body, a second end coupled to the body, a middle portion coupled to the L-shaped support and an angled portion extending upwardly at an angle of about forty degrees relative the first portion of the support.

12. The foot section claim 11, wherein the top plane of the body is positioned between the middle portion of the second support and the first and second ends of the second support.

13. A patient support comprising:
    a frame;
    a patient support surface coupled to the frame, the patient support surface including a back section, a seat section, and a foot section; and
    the foot section including a body having a bottom surface, a top surface having an uppermost surface that lies in a top plane, a head end portion, a foot end portion, and an end support including a bottom portion having an end coupled to the body, an upwardly extending side portion coupled to the bottom portion, and a middle portion coupled to the side portion, the top plane of the body being positioned between the bottom portion and the middle portion wherein the side portion extends upwardly at an angle relative to the bottom surface of the body.

14. The patient support of claim 13, wherein the angle relative to the bottom surface of the body is substantially equal to 40 degrees.

15. The patient support of claim 13, wherein the foot section further comprises an L-shape support having a first portion coupled to the body and a second portion coupled to the middle portion of the end support.

16. The patient support of claim 15, wherein the second portion of the L-shaped support includes a first end coupled to the first portion of the L-shaped support and a second end, the top plane is positioned between the first and second ends of the second portion of the L-shaped support.

17. The patient support of claim 13, wherein the foot section further includes mounting members configured to releasably couple with the frame.

18. The patient support of claim 13, wherein the foot section further comprises L-shaped support having a first portion directly coupled to the body and a second portion directly coupled to the middle portion of the end support.

19. A patient support comprising:
    a frame;
    a patient support surface supported by the frame, the patient support surface including a back section, a seat section, and a foot section; and
    the foot section including a body having a bottom surface, a top surface, a head end portion, a foot end portion, an L-shaped support having a first portion coupled to the body and a second portion spaced-apart from the body adjacent to the foot end portion, the second portion being substantially perpendicular to the top surface of the body, and a side portion extending at an angle of about forty degrees relative to the bottom surface.

20. The patient support of claim 19, further comprising a second support having a first portion coupled to the body and a second portion coupled to the L-shaped support.

21. The patient support of claim 20, wherein the second support includes a first end coupled to the body, a second end coupled to the body, and a middle portion coupled to the L-shaped support.

22. The patient support of claim 19, wherein the second portion of the L-shaped support includes a first end coupled to the first portion of the L-shaped support and a second end, the top surface of the body including an uppermost surface that lies in a top plane, the top plane is positioned between the first and second ends of the second portion of the L-shaped support.

23. The patient support of claim 19, wherein the L-shaped support is coupled to the bottom surface of the body.

24. The patient support of claim 19, wherein the foot section further includes mounting members configured to releasably couple with the frame.

* * * * *